United States Patent Office 3,663,606
Patented May 16, 1972

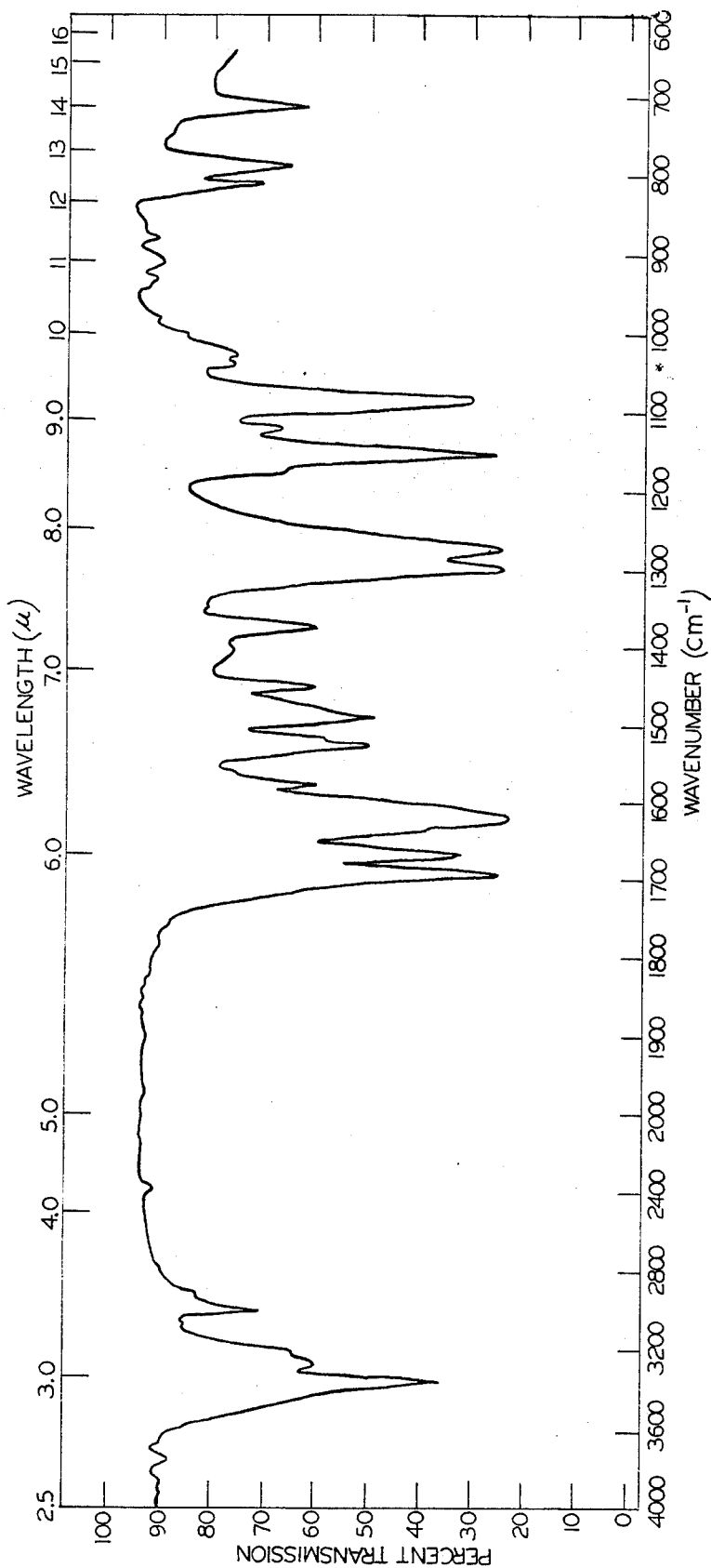

3,663,606
ORGANIC IMINO-COMPOUNDS
Yoshikazu Isowa, Tokyo, Japan, assignor to Mitsui Toatsu Chemicals Incorporated, Tokyo, Japan
Filed June 16, 1967, Ser. No. 646,536
Int. Cl. C07c 101/20
U.S. Cl. 260—471 A
2 Claims

ABSTRACT OF THE DISCLOSURE

Novel organic imino-compounds produced by decomposition with water or an alcohol of organic imino-compound metal chloride coordination complexes obtained by the reaction of an aliphatic or aromatic nitrile, e.g., acetonitrile or benzonitrile, and an active methylene compound, e.g., diethyl malonate, in the presence of a metal chloride, e.g., stannic chloride. Processes for producing such organic imino-compounds.

---

This invention relates to novel organic imino-compounds represented by the formula:

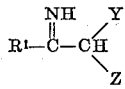

wherein $R^1$ is selected from the group consisting of alkyl and alkenyl radicals containing 1 to 20, preferably 1 to 13, carbon atoms, aralkyl radicals containing 7 to 20, preferably 7 to 12, carbon atoms, aryl radicals having 6 to 20, preferably 6 to 12, carbon atoms, substituted aryl radicals having 6 to 20, preferably 6 to 12, carbon atoms wherein said substituents are nitro, amino, halogen, $C_1$ to $C_6$ alkyl groups, or $C_1$ to $C_6$ alkoxy groups on the aromatic nucleus, and $C_6H_5CH=CH-$, $C_6H_5CO-$, and $C_6H_5COCH_2-$, radicals and Y and Z are each selected from $R^2OCO-$ and $R^3CO-$ radicals wherein $R^2$ is an alkyl radical containing 1 to 4 carbon atoms and $R^3$ is selected from the group consisting of alkyl radicals containing 1 to 4 carbon atoms and aryl radicals containing 6 to 20 carbon atoms. These novel compounds are obtained by decomposing metal chloride coordination complexes represented by the formula:

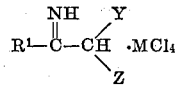

wherein $R^1$, Y and Z are the same as described above and M is a metal selected from tin and titanium with a decomposing agent, such as, water, aliphatic lower alcohols or a mixture thereof.

The above-mentioned metal chloride coordination complexes which are starting materials employed in the present invention can be synthesized by a process which I have invented and which is described in my application filed concurrently herewith. In this process a nitrile, an active methylene compound and metal chloride are made to react with each other as represented by the reaction formula:

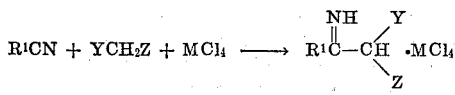

wherein $R^1$, Y, Z and M are the same as described above.

The nitriles used in this reaction are, for example, such saturated aliphatic nitriles as acetonitrile, propionitrile, n-butyronitrile, n-valeronitrile and n-tridecanenitrile, such unsaturated aliphatic nitriles as acrylonitrile, such aromatic nitriles as benzonitrile, 3,5-dinitrobenzonitrile, benzyl cyanide and cinnamonitrile and such ketonitriles as benzoyl cyanide and benzoyl acetonitrile.

The active methylene compounds used in this reaction are, for example, dimethyl or diethyl malonate, methyl or ethyl acetoacetate, ethyl benzoyl acetate and acetyl acetone.

The metal chlorides are stannic chloride $SnCl_4$ and titanium tetrachloride $TiCl_4$.

The novel imino-compounds, according to this invention, are synthesized from the thus synthesized metal chloride coordination complexes by removing the metal chlorides by the decomposition process of the present invention.

The decomposing agent used is water or an alcohol. Examples of the alcohol are aliphatic lower alcohols having 1 to 8 carbon atoms, preferably alkanols, such as, methanol, ethanol and isopropanol. The reaction temperature to be used is about normal temperature. A solvent, such as, chloroform, benzene or toluene, can be used.

It can be confirmed from the elementary analysis values and infrared spectra shown in the following examples that the products obtained by the present invention are organic imino-compounds.

It is evident also from the fact that an absorption band of 1665 cm.$^{-1}$ characteristic of an imino radical appears in the infrared spectrum of diethyl benzimidoylmalonate shown in FIG. 1. The organic imino-compounds can also take the form of tautomeric enamines,

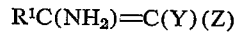

The imino-compounds obtained by the present invention are useful as additives for plastics and as intermediates for the manufacture of such chemicals as medicines and agricultural chemicals.

They are all useful as ultraviolet ray absorbers for use in sun-tan lotions, paints, transparent and opaque plastics and the like for blocking or reducing the passage of ultraviolet rays. For example, an ethanol solution of ethyl benzimidoyl-benzoylacetate of the present invention has a strong absorption maximum at 315 m$\mu$ in the ultraviolet spectrum and an ethanol solution of ethyl benzimidoylacetoacetate has it at 308 m$\mu$. Further, an ethanol solution of diethyl cinnamimidoylmalonate well absorbs ultraviolet rays of 250 m$\mu$ to 340 m$\mu$.

The following examples are presented:

EXAMPLE 1

2.9 g. of crystals of a complex of the formula,

produced from benzonitrile, diethyl malonate and stannic chloride were suspended in 50 cc. of benzene. 100 cc. of water were added thereto and the mixture was stirred at room temperature for 30 minutes to 1 hour. At the end of this time the crystals had dissolved. The benzene layer was separated, was washed with water, aqueous sodium bicarbonate, and water in the order mentioned and was dried to produce crystals. The crystals were recrystallized from a small amount of benzene and white, needle crystals of diethyl benzimidoylmalonate of the formula

having a melting point of 102 to 103° C. were obtained.
*Analysis.*—Calcd. for $C_{14}H_{17}NO_4$ (percent): C, 63.86; H, 6.51; N, 5.32. Found (percent): C, 63.56; H, 6.45; N, 5.03.

The infrared absorption spectrum of the product is shown in FIG. 1.

EXAMPLE 2

A complex of the formula

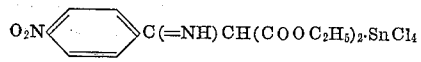

produced from p-nitrobenzonitrile, diethyl malonate and stannic chloride was dissolved in a small amount of methanol. The resulting solution was left standing and crystals were deposited. When these crystals were recrystallized from methanol, crystals of diethyl p-nitrobenzimidoylmalonate of the formula,

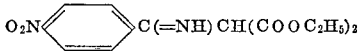

having a melting point of 153 to 154° C. were obtained.

*Analysis.*—Calcd. for $C_{14}H_{16}N_2O_6$ (percent): C, 54.54; H, 5.23; N, 9.09. Found (percent): C, 54.13; H, 5.23; N, 9.04.

EXAMPLE 3

50 cc. of water and 50 cc. of benzene were added to 3.65 g. of a complex of

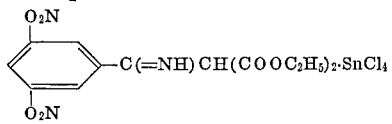

produced from 3,5-dinitrobenzonitrile, diethyl malonate and stannic chloride and the resulting mixture was stirred at room temperature. The complex dissolved. The benzene layer was separated, was washed with water and was dried with sodium sulfate. When the solvent was distilled away, a crystalline residue was obtained. When it was recrystallized from benzene, 1.15 g. of diethyl 3,5-dinitrobenzimidoylmalonate of the formula,

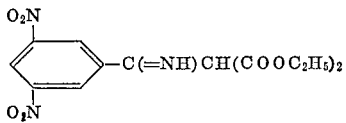

having a melting point of 122° C. were obtained.

*Analysis.*—Calcd. for $C_{14}H_{15}O_8N_5$ (percent): C, 47.59; H, 4.28; N, 11.90. Found (percent): C, 47.81; H, 4.39; N, 12.17.

EXAMPLE 4

50 cc. of water were added to 10 g. of a complex of the formula $$C_6H_5C(=NH)CH(COOC_2H_5)_2 \cdot TiCl_4$$

produced from benzonitrile, diethyl malonate and titanium tetrachloride. The mixture was stirred at room temperature for 30 minutes and 3.5 g. of white crystals were obtained. When the crystals were recrystallized from a small amount of benzene, 2.0 g. of needle crystals of diethyl benzimidoylmalonate having the formula $$C_6H_5C(=NH)CH(COOC_2H_5)_2$$

and a melting point of 107 to 108° C. were obtained. The yield was 34%.

EXAMPLE 5

70 cc. of chloroform and 100 cc. of water were added to 43 g. of a complex of the formula, $$CH_3C(=NH)CH(COCH_3)COOC_2H_5 \cdot SnCl_4$$

produced from acetonitrile, ethyl acetoacetate and stannic chloride and the mixture was stirred at room temperature for 1 hour. After the complex dissolved, the solvent layer was separated, was washed with water and was then dried with sodium sulfate. When the chloroform was distilled away, 14.5 g. of an oily residue were obtained. When the residue was left in a refrigerator overnight, it crystallized. When the crystals were recrystallized from ligroin-benzene, needle crystals of ethyl acetimidoylacetoacetate having the formula, $$CH_3C(=NH)CH(COCH_3)COOC_2H_5$$

and a melting point of 51° C. were obtained.

*Analysis.*—Calcd. for $C_3H_{13}O_3N$ (percent): C, 56.12; H, 7.65; N, 8.10. Found (percent): C, 55.62; H, 7.55; N, 8.06.

EXAMPLE 6

200 cc. of chloroform and 300 cc. of water were added to 14 g. of a complex of the formula $$C_6H_5C(=NH)CH(COCH_3)COOC_2H_5 \cdot SnCl_4$$

produced from benzonitrile, ethyl acetoacetate and stannic chloride. After the mixture was stirred at room temperature, the solvent layer was separated, was washed with water and was then dried with sodium sulfate. After the solvent was distilled away, the residue was left to crystallize in a refrigerator. When the crystals were recrystallized from n-hexane, 21.8 g. of crystals of ethyl benzimidoylacetoacetate of the formula, $$C_6H_5C(=NH)CH(COCH_3)COOC_2H_5$$

and a melting point of 75 to 76° C. were obtained. The yield was 31%.

*Analysis.*—Calcd. for $C_{13}H_{15}NO_3$ (percent): C, 66.93; H, 6.48; N, 6.01. Found (percent): C, 66.93; H, 6.44; N, 5.90.

EXAMPLE 7

100 cc. of methanol were added to 34 g. of a complex of the formula, $$C_6H_5C(=NH)CH(COCH_3)COOC_2H_5 \cdot TiCl_4$$

produced from benzonitrile, ethyl acetoacetate and titanium tetrachloride and the resulting mixture was stirred at room temperature for 1 hour. When the obtained crystals were recrystallized from n-hexane, 10.5 g. of crystals of ethyl benzimidoylacetoacetate of the formula, $$C_6H_5C(=NH)CH(COCH_3)COOC_2H_5$$

and a melting point of 75 to 76° C. were obtained. The yield was 56.2%.

EXAMPLE 8

26.1 g. of stannic chloride were dropped with stirring into a mixed solution of 10.3 g. of benzonitrile and 19.2 g. of ethyl benzoylacetate while the temperature was kept below 60° C. White crystals were thus produced. They solidified after the completion of the dropping. When the crystals were heated at a temperature of 70° C. for 1 hour to complete the reaction, were left to cool at room temperature, were then washed with ether and were dried, 44 g. of a white powder of a melting point of 213 to 215° C. were obtained. This product was a stannic chloride complex of ethyl benzimidoylbenzoylacetate of the formula, $$C_6H_5C(=NH)CH(COC_6H_5)COOC_2H_5 \cdot SnCl_4$$

The yield was 79%.

*Analysis.*—Calcd. for $C_{18}H_{17}NO_3 \cdot SnCl_4$ (percent): C, 38.90; H, 3.08; N, 2.52; Cl, 25.52. Found (percent): C, 41.89; H, 4.66; N, 2.18; Cl, 22.89.

Then, 19.5 g. of the above-mentioned ethyl benzimidoylbenzoylacetate·stannic chloride complex were dissolved in 100 cc. of chloroform. 100 cc. of water were added to the solution. The solution was stirred at room temperature and then the solvent layer was separated, was washed with water and was then dried with sodium sulfate. The solvent was distilled away. When the residual crystals were then recrystallized from ligroin, 4 g. of crystals of ethyl benzimidoylbenzoylacetate having the formula, $$C_6H_5C(=NH)CH(COC_6H_5)COOC_2H_5$$

and a melting point of 120 to 121° C. were obtained. The yield was 28%.

*Analysis.*—Calcd. for $C_{18}H_{17}NO_3$ (percent): C, 73.20; H, 5.80; N, 4.74. Found (percent): C, 72.49; H, 5.76; N, 4.68.

EXAMPLE 9

A small amount of the ethyl benzimidoylbenzoylacetate·stannic chloride complex mentioned in Example 8 was dissolved in methanol. When the solution was left standing, crystals were deposited. When they were recrystallized from methanol, crystals of a melting point of 120 to 121° C. were obtained. It was confirmed from the infrared absorption spectrum that this product was the same ethyl benzimidoylbenzoylacetate as the product formed in Example 8.

EXAMPLE 10

39 g. of stannic chloride were dropped into a mixture of 19.5 g. of benzoyl cyanide and 24 g. of diethyl malonate. When the mixture was left standing overnight, it crystallized. The crystals were stirred with the addition of 100 cc. of water and 100 cc. of chloroform. The solvent layer was separated, was washed twice with water and was then dried with sodium sulfate. When the solvent was distilled away, the residue crystallized. When the crystals were recrystallized from benzene, 20 g. of crystals of diethyl benzoylformimidoylmalonate of the formula $$C_6H_5COC(=NH)CH(COOC_2H_5)_2$$

were obtained.

*Analysis.*—Calcd. for $C_{13}H_{17}O_5N$ (percent): C, 61.85; H, 5.8; N, 4.81. Found (percent): C, 62.02; H, 5.90; N, 4.63.

EXAMPLE 11

A mixture of 4.35 g. of benzoyl-acetonitrile and 4.8 g. of diethyl malonate was dissolved in 10 cc. of chloroform. A mixed solution of 7.8 g. of stannic chloride and 15 cc. of chloroform was dropped into the above solution. The temperature was kept below 30° C. After the completion of the dropping, when the solution was warmed and refluxed, white crystals were deposited in 2 hours.

When the crystals were warmed for 30 minutes and were left standing overnight, 15.5 g. of white crystals were obtained. When the crystals were stirred with the addition of 30 cc. of 70% ethanol and 30 cc. of chloroform, the complex decomposed. The solvent layer was washed with water, was dried and was then concentrated. When the residue was recrystallized from benzene, white crystals of diethyl benzoylacetimidoylmalonate of the formula, $$C_6H_5COCH_2C(=NH)CH(COOC_2H_5)_2$$

and a melting point of 131 to 132° C. were obtained.

*Analysis.*—Calcd. for $C_{16}H_{19}O_5N$ (percent): C, 62.94; H, 6.27; N, 4.57. Found (percent): C, 63.34; H, 6.34; N, 4.16.

EXAMPLE 12

60 cc. of water and 80 cc. of benzene were added to 22 g. of diethyl cinnamimidoylmalonate·stannic chloride complex of the formula $$C_6H_5 \cdot CH=CH-C(=NH)CH(COOC_2H_5)_2 \cdot SnCl_4$$

produced from cinnamonitrile, diethyl malonate and stannic chloride. The mixture was stirred at room temperature for 4 hours. Then, the benzene layer was separated, was washed with water, was dried with sodium sulfate, was concentrated and was left standing. When the crystals were recrystallized from benzene, yellow crystals of diethyl cinnamimidoylmalonate of the formula, $$C_6H_5 \cdot CH=CH-C(=NH)CH(COOC_2H_5)_2$$

and a melting point of 45 to 45.5° C. were obtained.

*Analysis.*—Calcd. for $C_{16}H_{19}NO_4$ (percent): C, 66.42; H, 6.62; N, 4.84. Found (percent): C, 66.49; H, 6.86; N, 4.49.

The following description illustrates the effect of some of the products of this invention to improve the light stability of polyvinyl chloride compositions.

Compositions are prepared by mixing 100 parts of polyvinyl chloride with 50 parts of di-octylphthalate and 2 parts of barium-cadmium laurate and with or without 2 parts of one of the compounds set forth below on rolls at a roll temperature of 150 to 160° C. to form a homogeneous composition which is removed from the roll in crude sheets. From the milled composition, finished sheets are molded which are about 0.5 mm. in thickness. The compounds used are ethyl benzimidoylacetoacetate, ethyl benzimidoylbenzoylacetate and diethyl cinnamimidoylmalonate.

After weatherometer exposure for 50 hours, the specimens without the compounds set forth above are discolored from colorless to orange, but the specimens with the compounds remained unchanged. Thus, articles made from polyvinyl chloride containing the novel compounds, such as building panels, storm window panes, packaging films, bottles and the like, do not discolor upon exposure to light.

What is claimed is:

1. Organic imino-compounds represented by the formula

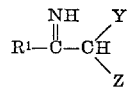

wherein $R^1$ is selected from the group consisting of alkyl containing from 1 to 13 carbon atoms, phenethyl, phenyl and nitro substituted phenyl, $C_6H_5CH=CH—$, $C_6H_5CO—$ and $C_6H_5COCH_2—$, Y and Z are each selected from the group consisting of $R^2OCO—$ and $R^3CO—$ wherein $R^2$ is alkyl containing from 1 to 4 carbon atoms and $R^3$ is selected from the group consisting of alkyl containing from 1 to 4 carbon atoms and phenyl.

2. An organic imino-compound as claimed in claim 1 wherein said imino-compound is selected from the group consisting of diethylbenzimidoylmalonate, diethyl p-nitrobenzimidoylmalonate, diethyl 3,5 - dinitrobenzimidoylmalonate, ethyl acetimidoylacetoacetate, ethyl benzimidoylacetoacetate, ethyl benzimidoylbenzoylacetate, diethyl benzoylformimidoylmalonate, diethyl benzoylacetimidoylmalonate and diethyl cinnamimidoylmalonate.

References Cited

UNITED STATES PATENTS 2,418,173   4/1947   Haury et al. _____ 260—566

OTHER REFERENCES

Organic Reactions, by Adams, J. T. et al. (vol. VIII), pub. by John Wiley & Sons, Inc. New York (1963), p. 249 relied on.

LORRAINE A. WEINBERGER, Primary Examiner

L. A. THAXTON, Assistant Examiner

U.S. Cl. X.R.

260—482 R; 566 R

UNITED STATES PATENT OFFICE
CERTIFICATE OF CORRECTION

Patent No. 3,663,606            Dated May 16, 1972

Inventor(s) Yoshikazu Isowa

It is certified that error appears in the above-identified patent and that said Letters Patent are hereby corrected as shown below:

Column 1, after line 5 and before line 6 insert:

Claims priority, applications Japan, June 21, 1966, 41-39826 and 41-39828; August 11, 1966, 41-52308, and August 15, 1966, 41-53232 --.

Signed and Sealed this second Day of August 1977

[SEAL]

Attest:

RUTH C. MASON
*Attesting Officer*

C. MARSHALL DANN
*Commissioner of Patents and Trademarks*